United States Patent
Larson et al.

(10) Patent No.: US 8,256,467 B1
(45) Date of Patent: Sep. 4, 2012

(54) PLUG WITH PRESSURE RELEASE VALVE

(75) Inventors: Richard E. Larson, Victoria, MN (US); Steven R. Cole, Collierville, TN (US)

(73) Assignee: IPS Corporation, Collierville, TN (US)

( * ) Notice: Subject to any disclaimer, the term of this patent is extended or adjusted under 35 U.S.C. 154(b) by 0 days.

(21) Appl. No.: 13/155,383

(22) Filed: Jun. 7, 2011

(51) Int. Cl.
*F16L 55/12* (2006.01)
*F16K 15/20* (2006.01)

(52) U.S. Cl. ....... 138/93; 137/226; 137/614.2; 137/853; 137/234.5

(58) Field of Classification Search .............. 138/93; 137/226, 614.2, 853, 234.5
See application file for complete search history.

(56) References Cited

U.S. PATENT DOCUMENTS

| | | | |
|---|---|---|---|
| 1,330,108 A * | 2/1920 | Bauhaus | 137/226 |
| 2,925,103 A * | 2/1960 | Kerr et al. | 141/349 |
| 3,241,571 A | 3/1966 | Garcia | |
| 3,291,156 A | 12/1966 | Corsano | |
| 3,494,504 A | 2/1970 | Jackson | |
| 3,613,936 A | 10/1971 | Kaiser et al. | |
| 3,667,640 A | 6/1972 | Morrow | |
| 4,084,304 A * | 4/1978 | Myers | 29/890.122 |
| 4,303,101 A | 12/1981 | Tholen | |
| 4,312,708 A | 1/1982 | Leslie | |
| 4,442,875 A * | 4/1984 | Genbauffe et al. | 141/348 |
| 4,493,344 A | 1/1985 | Mathison et al. | |
| 4,542,642 A | 9/1985 | Tagliarino | |
| 4,576,338 A * | 3/1986 | Klomp | 239/452 |
| 4,585,033 A | 4/1986 | Westman | |
| 4,614,206 A | 9/1986 | Mathison et al. | |
| 4,658,861 A | 4/1987 | Roberson, Sr. | |
| 4,780,378 A * | 10/1988 | McCartney et al. | 429/54 |
| 4,820,474 A | 4/1989 | Leslie et al. | |
| 5,035,266 A | 7/1991 | Benson et al. | |
| 5,076,328 A | 12/1991 | Lyon | |
| 5,131,433 A | 7/1992 | Sion et al. | |
| 5,181,977 A | 1/1993 | Gneiding et al. | |
| 5,209,266 A | 5/1993 | Hiemsoth | |
| 5,234,034 A | 8/1993 | Lyon | |
| 5,306,187 A * | 4/1994 | Mackal | 441/41 |
| 5,348,085 A | 9/1994 | Benson | |
| 5,353,841 A | 10/1994 | Matthison et al. | |
| 5,413,136 A | 5/1995 | Prescott | |
| 5,771,937 A | 6/1998 | Collins | |
| 5,778,923 A | 7/1998 | Marston | |
| 6,116,286 A | 9/2000 | Hooper et al. | |
| 6,230,327 B1 | 5/2001 | Briand et al. | |
| 6,427,714 B2 | 8/2002 | Freigang et al. | |
| 6,502,603 B2 | 1/2003 | Lane, Jr. | |
| 6,513,549 B2 | 2/2003 | Chen | |
| 6,901,966 B2 | 6/2005 | Onuki et al. | |
| 7,013,926 B1 | 3/2006 | Storey et al. | |
| 7,021,337 B2 | 4/2006 | Markham | |
| 7,325,574 B1 | 2/2008 | Beckey | |
| 7,404,412 B2 | 7/2008 | Milanovich et al. | |
| 7,597,118 B1 | 10/2009 | Peterson et al. | |

OTHER PUBLICATIONS

Cherne Industries Inc., Product Catalog LCS-801 (Jan. 2009, revised Jun. 2010), pp. 6, 7, 20, 21, Cherne Industries, Inc. (Minneapolis, Minnesota, U.S.A.) (downloaded from www.cherneind.com on Dec. 28, 2010).

(Continued)

*Primary Examiner* — James Hook
(74) *Attorney, Agent, or Firm* — Walker, McKenzie & Walker, P.C.

(57) ABSTRACT

A plug having a pressure release valve for releasing excess pressure within a bladder of the plug. The release valve has a valve core with a pressure release passage therethrough with an inlet in fluid communication with an interior void of the bladder and an outlet in fluid communication with the external environment outside the bladder. An elastomeric seal under hoop stress about a portion of the valve core seals the outlet until overinflation of the bladder causes the seal to become elastically deflected and unseal the outlet, thereby allowing excess pressure to be released. When the overinflation no longer exists because of the pressure release, the hoop stress of the seal causes resealing of the outlet. An inflation valve may also be provided to inflate the bladder, and with the inlet opening into an inflation passageway into the bladder's interior.

8 Claims, 4 Drawing Sheets

OTHER PUBLICATIONS

Cherne Industries Inc., Long Test-Ball—MS2 Test-Ball (2 pages), Cherne Industries, Inc. (Minneapolis, Minnesota, U.S.A.) (downloaded from www.cherneind.com on Dec. 28, 2010).

G.T. Water Products, Inc., SAFE-T-SEAL test plugs (4 pages), G.T. Water Products, Inc. (Moorpark, California, U.S.A.) (downloaded from www.gtwaterproducts.com/safe.php on Dec. 28, 2010).

G.T. Water Products, Inc., 2010 Product and Price List Catalog, (Oct. 2010) (8 pages), G.T. Water Products, Inc. (Moorpark, California, U.S.A.) (downloaded from www.gtwaterproducts.com on Jan. 5, 2011).

IPS Corporation, Pressure Relief (PR) Pneumatic Test Plugs (Apr. 2010) (2 pages), IPS Corporation (Collierville, Tennessee, U.S.A.) (downloaded from www.ipscorp.com/testtite/pneumaticplugs/pressurerelief on Dec. 28, 2010).

IPS Corporation, Test-Tite Pressure Relief Pneumatic Test Plug (Apr. 2010) (2 pages), IPS Corporation (Collierville, Tennessee, U.S.A.) (downloaded from www.ipscorp.com/testtite/pneumaticplugs/pressurerelief on Dec. 28, 2010).

* cited by examiner

PLUG WITH PRESSURE RELEASE VALVE

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO COMPACT DISC(S)

Not applicable.

BACKGROUND OF THE INVENTION

1. Field of the Invention

The present invention relates, in general, to plugs for use in pipe systems and, in particular, to a pneumatic plug for use in pipe systems, in which the plug has a pressure release valve.

2. Information Disclosure Statement

Drain, waste, and vent ("DWV") pipe or plumbing systems often include access openings or ports that allow the interior of the pipes of the pipe system to be inspected and/or cleaned. Likewise, sewer systems often include sewer pipes that empty into manholes or catch basins through openings or ports in the manhole or catch basin chambers. Access opening configurations for such pipe systems can vary in size and shape, although many configurations are standardized. In one common configuration, an access opening (often referred to as a "clean-out") is provided at the end of a relatively short section of cylindrical pipe that extends away from the axis of the main pipe section. Clean-outs may extend from a main pipe section at any angle. Those that extend approximately 90 degrees from the main pipe section are commonly called "clean-out tees" (referring to the T-shape created by the intersecting pipe sections). Other access openings include, but are not limited to, roof vents, storm drains, closet bends, and pipe ends, and the sewer pipe openings or ports in a manhole or catch basin chamber.

Access openings may also be used to test the integrity of the pipe system. Such a test is conducted by placing temporary plugs into all openings of the DWV system to create a closed system, and then pressurizing the now-closed system with a fluid, such as water or air, for a period of time to determine if the DWV system is leak free, in which case it will hold a rated pressure for the test duration. After successful testing, the plugs are removed. Such temporary plugs can generally be categorized into mechanical plugs and pneumatic plugs. Existing mechanical plugs typically include devices that seal pipe systems via mechanical activation, such as by turning a threaded connection member to expand an elastomeric ring that seals an inner surface of a pipe section. Existing pneumatic plugs include elongate elastomeric bladders that are attached directly to a source of fluid such as, typically and preferably, an air source. The bladders are inserted into the pipe system through the clean-outs or other access openings and are then inflated with the fluid so as to seal the pipe section as the bladder expands within the pipe. After testing, the temporary plugs are deflated or deactivated and then removed from the pipe system. In addition to the testing of DWV systems and/or sewer systems, it is often desired to seal a pipe line during a maintenance function, in which flow through the pipe is blocked for maintenance purposes even though pressure testing of the pipe system is not being performed.

Although some existing pneumatic plugs may display a maximum inflation pressure on the outside of the bladder, this does not provide protection for overinflation, but instead relies on the diligence of the operator and the existence and accuracy of an air inlet pressure gauge. If the elastomeric bladders of such pneumatic plugs become overinflated, problems could occur. The result when over-inflation occurs can be damage to the plug, damage to the pipe, inconvenience and delay of the testing process, or injury to the user if the plug explodes due to over-inflation. Known prior art solutions to this problem involve using an external pressure regulator or external pressure release device on the air inlet, but these solutions are cumbersome and are often ignored by operators, or the operator may be careless when using such regulators or pressure release valves. Pressure regulators do work but increase the inflation time, and they must be accurately set prior to use. Furthermore, each different type of pneumatic plug typically requires a different pressure setting to be made by the operator to accommodate plugs for different pipe diameters. External pressure release valves are also known to work, but are subject to failure if they become plugged and are typically unreliable for making accurate pressure settings. Such external pressure release valves must also be attached between the plug and the inflation hose, are often bulky, and also slow down the inflation process.

Some existing pneumatic plugs include integrated pressure release devices. However, such prior art pressure release devices tend to leak, do not provide repeatable results, and may disrupt testing of the pipe system. Specifically, some pneumatic plugs include release valves that have mechanical springs and seals, and have been found to be prone to fouling and often tend to collect contamination. Other pneumatic plugs include release valves that are positioned on the backside of the elastomeric bladder, venting into the pipe system being tested, and tend to expel the plug out of the pipe system and clean-out access, thereby disrupting the testing process.

One example of such a prior art plug is that made by Cherne Industries, Inc., Minneapolis, Minn., U.S.A., and sold under the trademark LONG TEST-BALL. This pneumatic plug has the disadvantage of having mechanical parts including springs and seals that tend to leak or not accurately release pressure at a repeatably accurate value.

Another pneumatic plug is made by GT Water Products, Inc., Moorpark, Calif., U.S.A., and sold under the trademark SAFE-T-SEAL, and has a pressure release on the bottom of the plug, remote from the pressurizing inlet and venting into the pipe system, which can cause the plug to be forced out of the pipe as the relieved pressure expels into the sealed pipe system being tested.

Still another prior art pneumatic plug is that disclosed in U.S. Pat. No. 7,597,118 (issued Oct. 9, 2009), fully included herein by reference, in which a portion of the elastomeric bladder is elastically deflected to unblock a pressure release channel when the bladder becomes overinflated.

As a result, there is a need for an improved pneumatic plug for use with a pipe section having a generally cylindrical internal pipe wall. The pneumatic plug should be easy to use and should not require the operator to make additional settings or readings. It should be reliable, provide repeatable results, and it should not require additional external equipment or otherwise disrupt testing of the pipe system.

It is therefore desirable to have a pneumatic plug for use in pressure testing a pipe system, in which the plug includes a pressure release valve in its inflation end remote from the pressurized pipe system being tested, wherein the pressure release valve provides a repeatable chosen release pressure, and in which the pressure release valve is more reliable than prior art pneumatic plug pressure release valves.

BRIEF SUMMARY OF THE INVENTION

Several preferred embodiments of the pressure release valve of the present invention are disclosed as a part of a pneumatic plug. The common feature of all embodiments is that an elastomeric seal stretchingly surrounds a portion of a valve core of the pressure release valve of the plug, and the seal, being under hoop stress around the portion of the valve core, seals a pressure release outlet until pressure within the plug overcomes the hoop stress of the seal so that excess fluid pressure within the plug is allowed to escape from an interior void of the plug's bladder when the plug's bladder becomes overinflated.

It is an object of the present invention to provide a plug for use in pressure testing a pipe system, in which the plug includes a pressure release valve in an inflation end of the plug remote from the pressurized pipe system being tested. It is a further object of the present invention that the pressure release valve provide a repeatable chosen release pressure, in which a given design and structure of the pressure release valve can be easily and simply adapted to accommodate different desired release pressures, and in which the pressure release valve is more reliable than prior art pneumatic plug pressure release valves.

DETAILED DESCRIPTION OF THE INVENTION

Referring to the figures of the drawings, various preferred embodiments of the present invention are shown. As seen best in FIG. 1, all embodiments of the present invention are plugs 30 for use in sealing a pipe 32 having a generally cylindrical internal pipe wall 34, and the difference between the different embodiments is the structure of the pressure release valve (1.36, 2.36, 3.36) that is mounted into one end 38 of the plug 30. As with prior art plugs, the plug 30 preferably may have a plurality of well-known ribs 28 encircling the plug to provide improved sealing of the plug 30 with the pipe wall 34 in a manner well-known to those skilled in the art. There are many similarities between the various embodiments, and only the differences between the embodiments will be discussed in detail, it being understood that similar structure for the various embodiments serves similar purpose. The reference numerals for the various parts of the embodiments shall be understood to have a prefix identifying the particular embodiments (e.g., "1.", "2.", "3.", etc.) and a suffix identifying the particular structure (e.g., "36", etc.), such that reference numerals with the same suffix are understood to be similar structure particular to each of the different embodiments (e.g., "1.36", "2.36", "3.36"). Reference numerals without a prefix (e.g., "30") shall be understood to indicate structure that is substantially the same for all embodiments.

Figures 1, 2, 3, 4, 5:
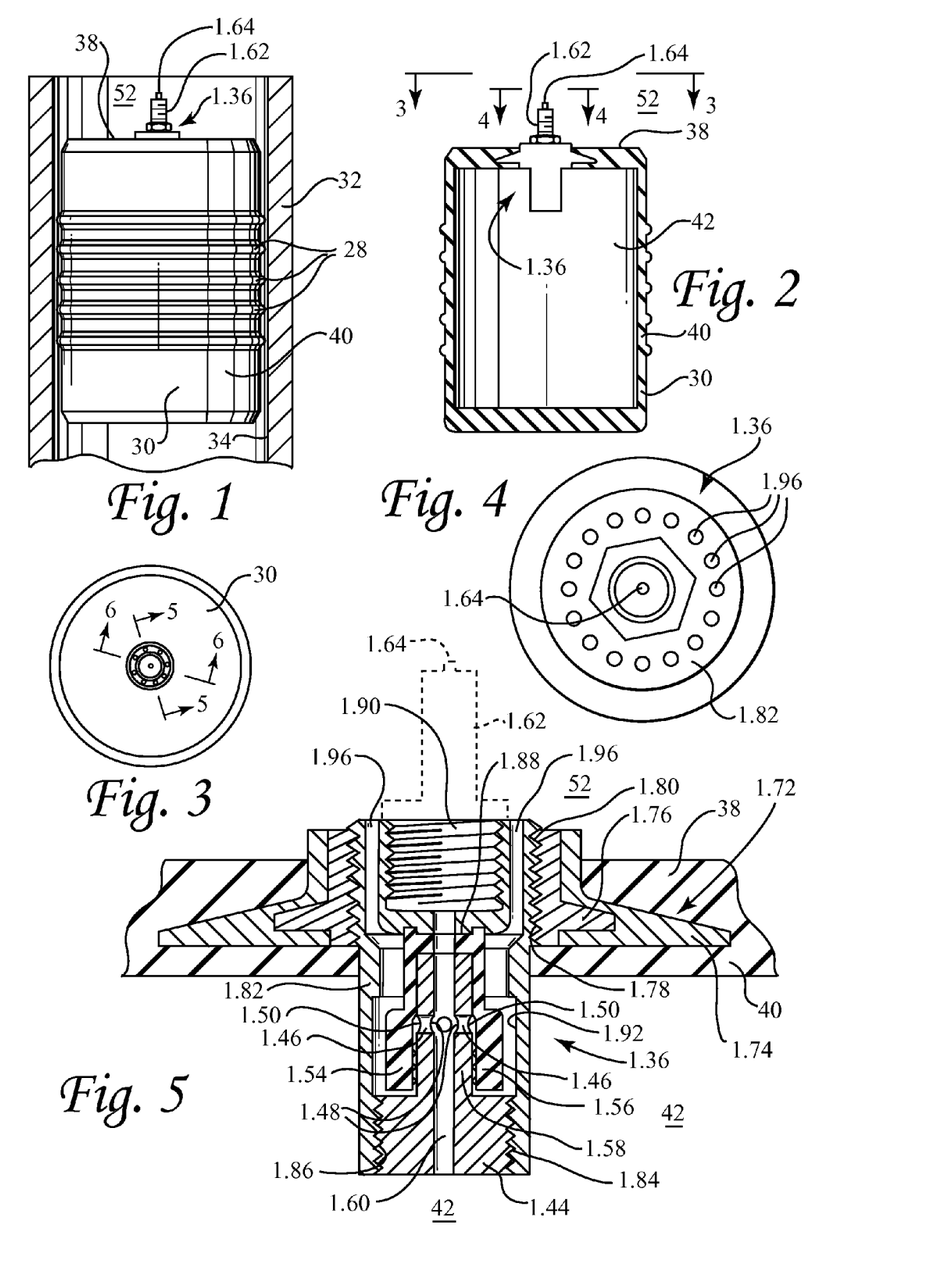
FIG. 1 is a view showing a pneumatic plug with pressure release valve of the present invention inserted into a pipe.
FIG. 2 is a sectional view taken along a diameter of a first embodiment of the present invention, with the pressure release valve of the first embodiment shown in outline.
FIG. 3 is an end view of the first embodiment of the present invention, taken substantially along the line 3-3 shown in FIG. 2.
FIG. 4 is an enlarged partial end view of the first embodiment of the present invention, showing a portion of the end view of FIG. 3 and being taken substantially along the line 4-4 shown in FIG. 2.
FIG. 5 is a partial sectional view of the first embodiment of the present invention, taken along a diameter of the pressure release valve of the first embodiment, with the sectional view being taken substantially along the line 5-5 shown in FIG. 3 and with the Schrader inflation valve being shown in dotted outline for clarity.

The plugs of all embodiments are substantially similar, and a description of the representative one shown in FIGS. 1 and 2 suffices for all embodiments. As shown in FIG. 1, plug 30 includes an inflatable bladder 40 having an interior void 42 defined within the bladder 40. As shown in the drawing figures, common to all embodiments of pressure release valve 1.36, 2.36, 3.36 is that they each include a valve core 1.44, 2.44, 3.44, preferably constructed of brass for durability, respectively having one or more pressure release passageways 1.46, 2.46, 3.46 therethrough, each having a pressure release inlet 1.48, 2.48, 3.48 being in fluid communication with interior void 42 and with each respective pressure release passageway 1.46, 2.46, 3.46 also respectively having a pressure release outlet 1.50, 2.50, 3.50 in fluid communication with an exterior environment 52 outside of bladder 40. It should be understood that other materials, such as aluminum, steel, etc., could be used to construct the valve core, but brass is the preferred material. Preferably, pressure release passageways 1.46, 2.46, 3.46 are formed by a pair of transverse bores through valve cores 1.44, 2.44, 3.44 at right angles with respect to each other, thereby producing four angularly-spaced pressure release passageways for the valve cores 1.44, 2.44, 3.44. Experimental prototypes of pressure release valves 1.36, 2.36, 3.36 were constructed with bores 1.46 having a diameter of 0.0785 inch (0.199 cm) and with bores 2.46, 3.46 having a diameter of 0.100 inch (0.254 cm).

All embodiments of the pressure release valve 1.36, 2.36, 3.36 of the present invention have an elastomeric seal 1.54, 2.54, 3.54 respectively having a first seal portion 1.56, 2.56, 3.56 under hoop stress about a respective portion 1.58, 2.58, 3.58 of the valve core 1.44, 2.44, 3.44 and respectively selectively sealing the pressure release outlet 1.50, 2.50, 3.50 from exterior environment 52 outside of bladder 40 such that, when overinflation of the bladder occurs, the first seal portion 1.56, 2.56, 3.56 becomes elastically deflected, in a manner hereinafter described in detail, to unseal the pressure release outlet 1.50, 2.50, 3.50 from the exterior environment 52 so as to allow excess fluid pressure within the bladder to be released through the pressure release passageway 1.46, 2.46, 3.46 and out the pressure release outlet 1.50, 2.50, 3.50 into the exterior environment 52. After sufficient excess fluid pressure within the bladder has been released, the hoop stress of the elastomeric seal 1.54, 2.54, 3.54 then causes the first seal portion 1.56, 2.56, 3.56 to reseal the pressure release outlet 1.50, 2.50, 3.50 from the exterior environment 52 in a manner hereinafter described in detail.

Preferably, all embodiments of the pressure release valve 1.36, 2.36, 3.36 of the present invention include an inflation passageway 1.60, 2.60, 3.60 through the valve and in fluid communication with interior void 42, with the inflation passageway 1.60, 2.60, 3.60 preferably being axially disposed in the valve core 1.44, 2.44, 3.44, and with an inflation valve 1.62, 2.62, 3.62 being interposed between the inflation passageway and the exterior environment, in a manner hereinafter described in detail. Preferably, in each embodiment, the inflation valve is a well-known Schrader valve having a depressible stem 1.64, 2.64, 3.64 that, in a manner well-known to those skilled in the art, opens the Schrader valve during inflation of the bladder 40 and that, when released, closes the Schrader valve after inflation, thereby causing fluid pressure to be retained within the inflated bladder 40 during testing of the pipe system. In all preferred embodiments of the pressure release valve 1.36, 2.36, 3.36 of the present invention, the pressure release inlets 1.48, 2.48, 3.48 open into the inflation passageway 1.60, 2.60, 3.60 so that the inflation path into the void 42 and the deflation of void 42 through passageways 1.46, 2.46, 3.46 is through the common fluid communication inflation passageway 1.60, 2.60, 3.60, thereby placing pressure release passageways 1.46, 2.46, 3.46 into fluid communication with void 42 through inflation passageway 1.60, 2.60, 3.60. The term "Schrader valve", as used herein, shall be understood not to mean a specific inflation valve from a particular vendor, but instead the term "Schrader valve" is used generically to refer to well-known so-called "tank valves" that provide for inflation from an air source that often has a hose that may be threadedly received upon external threads of the valve, with such valves typically having an axial valve stem that, when the stem is depressed into the valve, allow pressure to be released through the valve.

Figures 6, 7, 8, 9, 10:
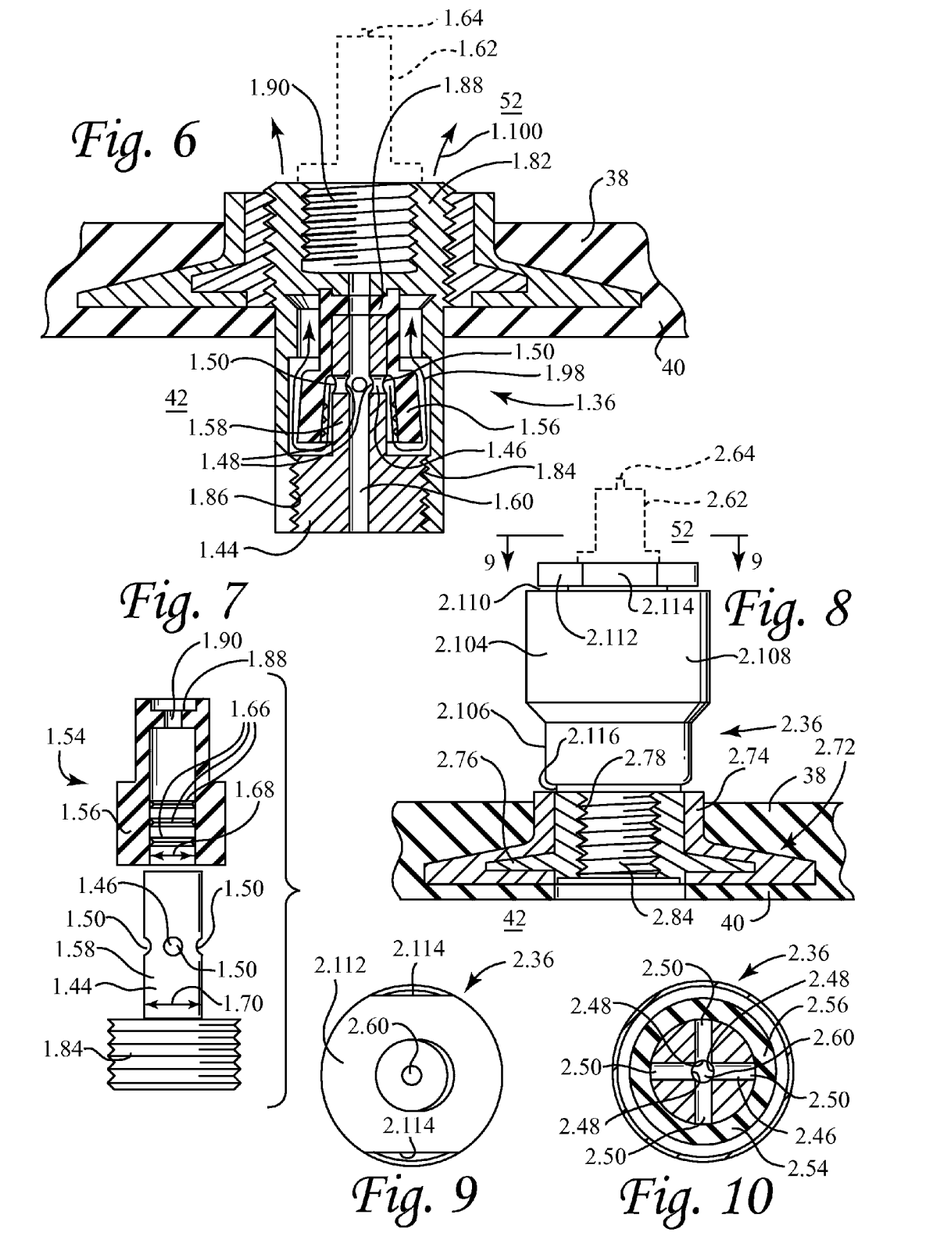
FIG. 6 is a partial sectional view of the first embodiment of the present invention, taken along a different diameter of the pressure release valve of the first embodiment than that shown in FIG. 5, with the sectional view being taken substantially along the line 6-6 shown in FIG. 3, and also showing release of overinflation pressure by elastic deflection of the elastomeric seal.
FIG. 7 is a side view of the valve core of the first embodiment of the present invention with a sectional view of the elastomeric seal prior to fitting onto the valve core so as to cause the seal to have hoop stress.
FIG. 8 is a partial side sectional view of the second embodiment of the present invention, taken along a diameter of the pressure release valve of the second embodiment, with the Schrader inflation valve being shown in dotted outline for clarity.
FIG. 9 is an end view of the second embodiment of the present invention, taken substantially along the line 9-9 shown in FIG. 8.
FIG. 10 is a transverse sectional view of the second embodiment of the present invention, taken substantially along the line 10-10 shown in FIG. 11.
Figures 11, 12, 13:
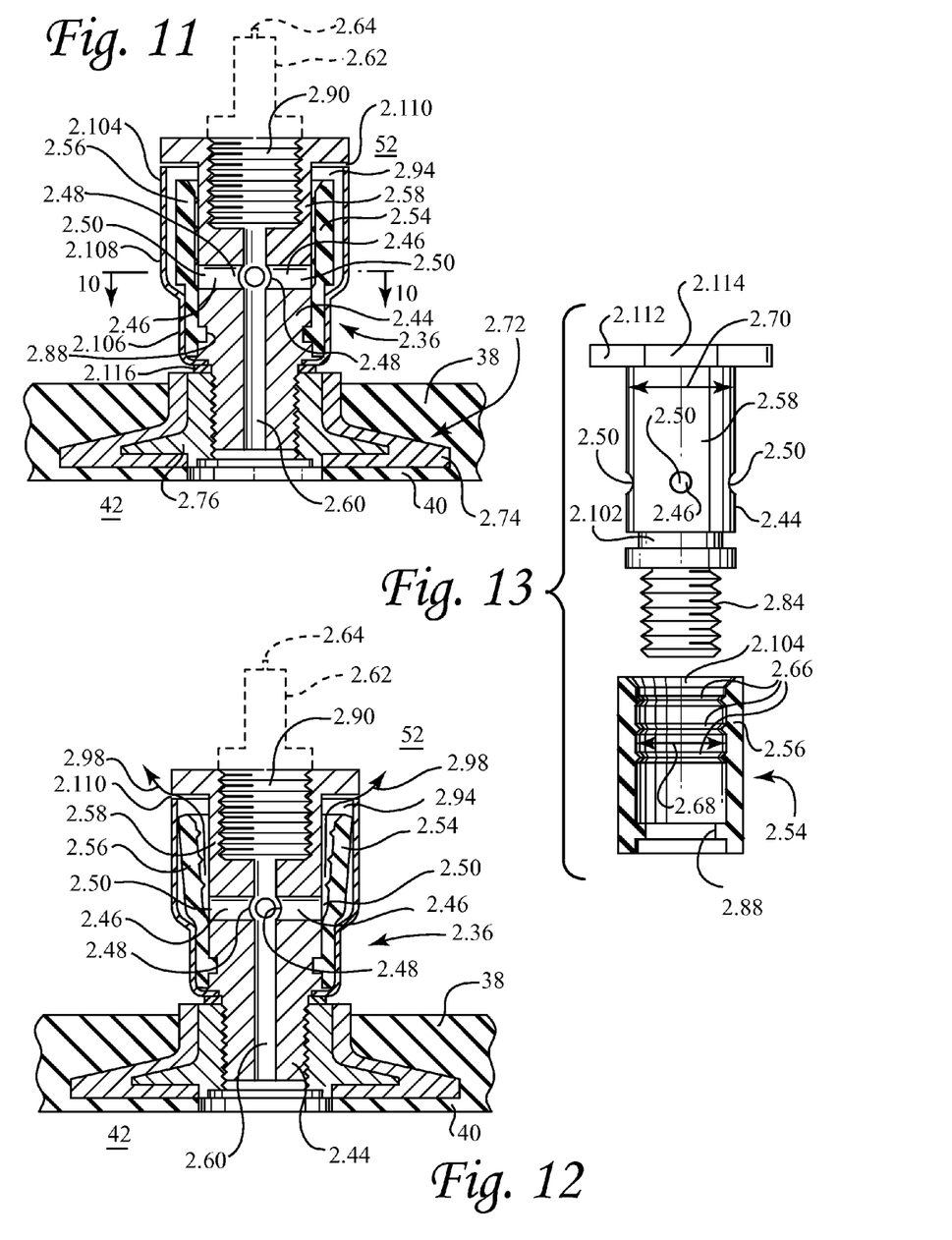
FIG. 11 is a partial sectional view of the second embodiment of the present invention, taken along a diameter of the pressure release valve of the second embodiment, and with the Schrader inflation valve being shown in dotted outline for clarity.
FIG. 12 is a partial sectional view of the second embodiment of the present invention, similar to FIG. 11 but showing release of overinflation pressure by elastic deflection of the elastomeric seal.
FIG. 13 is a side view of the valve core of the second embodiment of the present invention with a sectional view of the elastomeric seal prior to fitting onto the valve core so as to cause the seal to have hoop stress.

It should be noted that, in all embodiments, first seal portion 1.56, 2.56, 3.56 preferably has one or more closed ribs 1.66, 2.66, 3.66 (shown somewhat exaggerated in the drawings for purposes of illustration, and best seen in FIGS. 7 and 13) that extend radially inward to engage portion 1.58, 2.58, 3.58 of the valve core 1.44, 2.44, 3.44, so as to form a better sealing of the pressure release outlets 1.50, 2.50, 3.50. In all embodiments of pressure release valve 1.36, 2.36, 3.36, both elastomeric seal 1.54, 2.54, 3.54 and valve core 1.44, 2.44, 3.44 are preferably substantially cylindrically symmetrical. It should be further noted that, in all embodiments of pressure release valve 1.36, 2.36, 3.36, the inner diameter 1.58, 2.58 of first seal portion 1.56, 2.56 is less than the outer diameter 1.70, 2.70 of portion 1.58, 2.58 of the valve core 1.44, 2.44 prior to stretchingly fitting elastomeric seal 1.54, 2.54 onto valve core 1.44, 2.44 (see FIGS. 7 and 13). As hereinafter explained, the structure of seal 2.54 and valve core 2.44 is the same as the structure of seal 3.54 and valve core 3.44, such that FIG. 13 suffices for showing the structure of both the second and third embodiments of pressure release valve 2.36, 3.36. Because the inner diameter of the first seal portion of the unstretched elastomeric seal is smaller than the outer diameter of the portion of the valve core that is engaged by the first seal portion, the first seal portion of the elastomeric seal is caused to be under hoop stress about the valve core when fitted thereon, thereby causing the elastomeric seal to selectively seal the pressure release outlet 1.50, 2.50, 3.50 from the exterior environment 52 in a manner hereinafter described in detail.

With all embodiments, elastomeric seal 1.54, 2.54, 3.54 is preferably made of rubber having characteristics of a preferred tensile strength at least 2800 pounds minimum, a preferred durometer rating of 52 Shore A (+/−4), and an elongation rating of 500% (+/50). The radial thickness of first seal portion 1.56, 2.56, 3.56 preferably has a thickness of about 0.100 inch to about 0.200 inch (about 0.254 cm to about 0.508 cm), which yields a pressure release value when installed on a valve core of between about 5 psig and 45 psig. It will be understood that the pressure release value is determined by the characteristics of the rubber used for elastomeric seal 1.54, 2.54, 3.54, the radial thickness of first seal portion 1.56, 2.56, 3.56, and the hoop stress of first seal portion 1.56, 2.56, 3.56 around portion 1.58, 2.58, 3.58 of valve core 1.44, 2.44, 3.44. The hoop stress is understood to be determined by the relative dimensions of the valve core's outer diameter (e.g., outer diameter 1.70, 2.70 of portion 1.58, 2.58 of the valve core 1.44, 2.44) as compared to the seal's inner diameter (e.g., inner diameter 1.58, 2.58) (i.e., the amount that the seal has to be stretched to go on to the valve core). For example, a valve core having an outer diameter of 0.250 inch (0.635 cm) with a seal having an inner diameter of 0.225 inch (0.5715 cm) stretched thereon produced a pressure release value of 15 psig. When the same seal is fitted around a valve core having a larger outer diameter of 0.300 inch (0.762 cm), the pressure release value increased to 22 psig. Thus, by varying the seal thickness and the hoop stress (determined by the relative dimensions of the valve core's outer diameter as compared to the seal's inner diameter), pressure release values of 25 psig, 30 psig, 35 psig, and 40 psig can be obtained as needed for various size plugs (larger plugs require a pressure release rating of about 25 psig, whereas smaller size plugs require a pressure release rating of about 40 psig). Experimental testing has shown that different batches of seals, having the same dimensions and nominal characteristics (durometer rating, tensile strength rating, and elongation rating) can vary in the resulting pressure release values that are produced, thereby necessitating quality control and testing of each batch of valves to ensure that the desired pressure release rating is achieved after the valve is assembled.

Now that the common structure of all embodiments has been described, specific differences between the embodiments can now be discussed in detail.

The "internal" version (embodiment 1.36) of the pressure release valve of the present invention may be used when a lower profile is desired for the plug because, on some plugs, the "external" versions (embodiments 2.36 and 3.36) might extend too far outside the plug, which might make the valve susceptible to damage and/or breaking when used.

To supplement the disclosure hereinabove, and referring to FIGS. 2 through 6, the specific structure of pressure release valve 1.36 can now be explained in greater detail.

Molded into the end 38 of plug 30 is a cylindrically-symmetric rigid fitting 1.72 comprising inner and outer pieces 1.74 and 1.76. Inner piece 1.76, preferably made of brass, has internal ¼ NPT pipe threads 1.78 that threadedly engage with external ¼ NPT pipe threads 1.80 of valve body 1.82, also preferably made of brass, of pressure release valve 1.36. It should be understood that other materials, such as aluminum, steel, etc., could be used to construct these parts, but brass is the preferred material. It should also be understood that other thread sizes could be used as well if desired, but ¼ NPT pipe threads are preferred because of their common use in industry.

Valve core 1.44 has external ¼ NPT pipe threads 1.84 that threadedly engage internal pipe threads 1.86 of valve body 1.82. It should also be understood that other thread sizes could be used as well if desired, but ¼ NPT pipe threads are preferred because of their common use in industry. Elastomeric seal 1.54 has an inwardly radially-extending flange or second portion 1.88 forming an axial bore 1.90 that becomes an upper end extension of inflation passageway 1.60 when elastomeric seal 1.54 is received onto valve core 1.44. As best seen by comparing FIG. 7 with FIG. 5, when valve core 1.44, with elastomeric seal 1.54 fitted thereon, is threadedly received into valve body 1.82 by engagement of external threads 1.84 of valve core 1.44 with internal threads 1.86 of valve body 1.82, flange second portion 1.88 becomes entrappingly sealed between valve body 1.82 and valve core 1.44, as best seen in FIGS. 5 and 6.

Valve body 1.82 further has internal ¼ NPT pipe threads 1.90 for threadedly receiving the mating external ¼ NPT pipe threads of inflation valve 1.62, preferably a well-known Schrader valve. It should be understood that other thread sizes for inflation valve 1.62 could be used as well if desired, but ¼ NPT pipe threads are preferred because of their common use in industry. Still further, valve body 1.82 has a cylindrical recess 1.92 that forms an annulus gap 1.94 around seal portion 1.56 so that seal portion 1.56 may become elastically deflected, as shown in FIG. 6 (compare with FIG. 5), to allow excess fluid pressure within bladder 40 to be released, in a manner hereinafter described. Valve body 1.82 further has a plurality of venting bores 1.96 that put annulus gap 1.94 in fluid communication with exterior environment 52. When overinflation of bladder 40 occurs, the excess fluid pressure within bladder 40 causes first seal portion 1.56 to become elastically deflected radially outward, thereby unsealing pressure release outlet 1.50 and allowing the excess pressure to escape along path 1.98, then through bores 1.96, then out to exterior environment 52 as by path 1.100 (see FIGS. 4, 5 and 6).

To supplement the disclosure hereinabove, and referring to FIGS. 8 through 13, the specific structure of pressure release valve 2.36 can now be explained in greater detail.

As with the first embodiment 1.36, for the second embodiment 2.36, molded into the end 38 of plug 30 is a cylindrically-symmetric rigid fitting 2.72 comprising outer and inner pieces 2.74 and 2.76. Inner piece 2.76, preferably made of brass, has internal ¼ NPT pipe threads 2.78 that threadedly engage with external ¼ NPT pipe threads 2.84 of valve core 2.44. It should be understood that other materials, such as aluminum, steel, etc., could be used to construct these parts, but brass is the preferred material. It should also be understood that other thread sizes could be used as well if desired, but ¼ NPT pipe threads are preferred because of their common use in industry.

Elastomeric seal 2.54 has an inwardly radially-extending flange or second portion 2.88 that is received into a circumferential groove 2.102 of valve core 2.44, and preferably has a beveled end 2.104 (see FIG. 13) for easing the stretching fitting of seal 2.54 onto valve core 2.44. After elastomeric seal 2.54 has been stretchingly fitted onto valve core 2.44, a brass ferrule 2.104 is fitted about seal 2.54 and a first portion 2.106 of ferrule 2.104 is crimped onto seal 2.54 over second portion 2.88 so as to crimpingly seal second portion 2.88 to valve core 2.44. It should be understood that other materials, such as aluminum, steel, etc., could be used to construct the ferrule, but brass is the preferred material. Ferrule 2.104 also has an uncrimped second portion 2.108 that forms an annulus gap 2.94 around seal portion 2.56 so that seal portion 2.56 may become elastically deflected, as shown in FIG. 12 (compare with FIG. 11), to allow excess fluid pressure within bladder 40 to be released, in a manner hereinafter described. When crimpingly received over seal 2.54, a gap 2.110 is left between the top of ferrule 2.104 and the outer circumferential top flange 2.112 of valve core 2.44. When overinflation of bladder 40 occurs, the excess fluid pressure within bladder 40 causes first seal portion 2.56 to become elastically deflected radially outward, thereby unsealing pressure release outlet 2.50 and allowing the excess pressure to escape along path 2.98 and out to exterior environment 52 through gap 2.110, as best seen in FIG. 12.

Flange 2.112 of valve core 2.44 preferably has opposed flat portions 2.114 for gripping by a wrench when threadedly inserting the external threads 2.84 of valve core 2.44 into internal threads 2.78 of inner piece 2.76 of fitting 2.72. Preferably, a fiber washer 2.116 is provided to seal the bottom of ferrule 2.104 to inner piece 2.76 of fitting 2.72.

Similar to pressure release valve 1.36, valve core 2.44 of pressure release valve 2.36 preferably has internal ¼ NPT pipe threads 2.90 for threadedly receiving the mating external ¼ NPT pipe threads of inflation valve 2.62, preferably a well-known Schrader valve. It should also be understood that other thread sizes could be used as well if desired, but ¼ NPT pipe threads are preferred because of their common use in industry.

Figure 14:
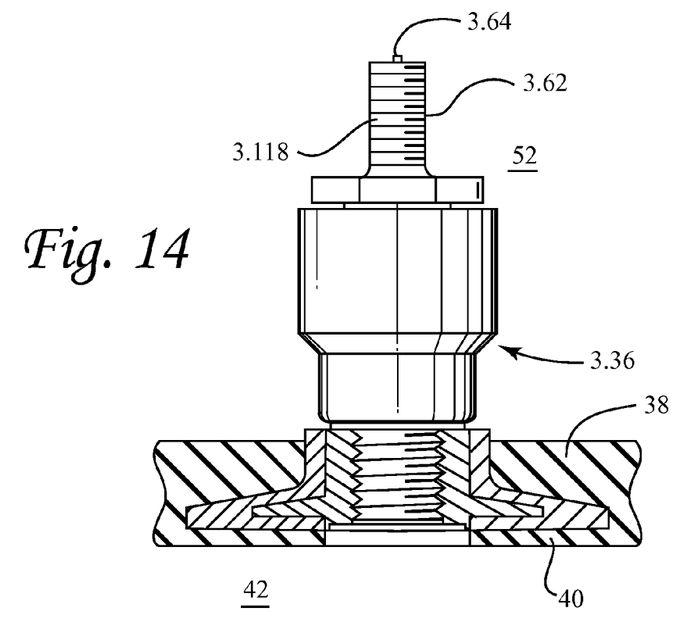
FIG. 14 is a partial side sectional view of the third embodiment of the present invention, taken along a diameter of the pressure release valve of the third embodiment.
Figure 15:
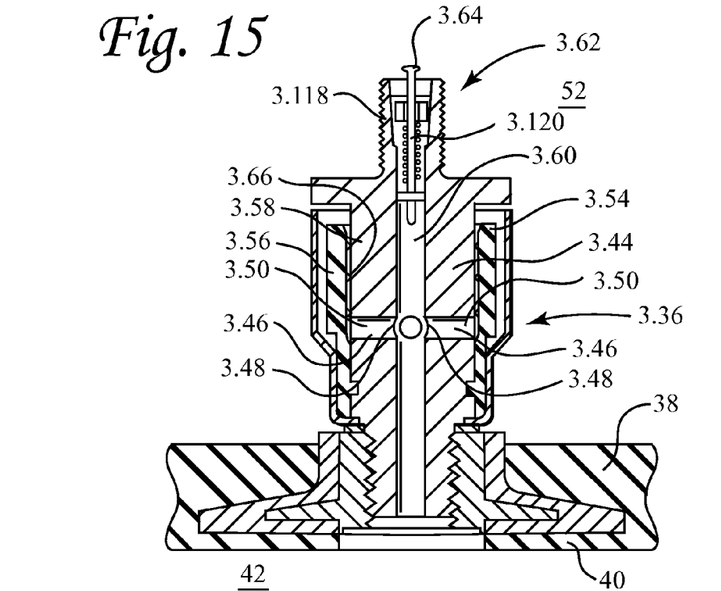
FIG. 15 is a partial sectional view of the third embodiment of the present invention, taken along a diameter of the pressure release valve of the second embodiment and with some parts of the Schrader inflation valve insert being removed for clarity.

Referring now to FIGS. 14 and 15, the third embodiment 3.36 of the pressure release valve of the present invention can now be described. The third embodiment 3.36 is identical in all respects to the second embodiment 2.26 except for the mounting of the inflation valve 3.62. Rather than have a separate inflation valve (again, preferably a Schrader valve) that is threadedly received into the valve core as in the second embodiment 2.26, for the third embodiment, the outer body 3.118 of the inflation valve 3.62 of the third embodiment 3.36 is integrally formed with the valve core 3.44, and a well-known Schrader valve core 3.120 is threadedly received into outer body 3.118 with the resulting similar structure and function as in the second embodiment 2.36. The other structure of the third embodiment 3.36 need not be described in detail because, except for the mounting of the inflation valve 3.62, the description of the second embodiment 2.36 suffices for the third embodiment 3.36.

It shall also be understood that, without departing from the spirit and scope of the present invention, a modified version of the first embodiment 1.62 is possible whereby the Schrader inflation valve 1.62 of the first embodiment 1.36 of the present invention may instead be integrally formed with valve body 1.82 and a Schrader valve core inserted therein as with the third preferred embodiment 3.36, rather than the inflation valve 1.62 being screwingly received into the valve body 1.82 as shown for the first embodiment disclosed hereinabove.

To use any of the embodiments of the present invention, plugs 30 are inserted into all openings of the DWV system or sewer system being tested, or into a pipe that is being blocked in order to perform a maintenance function (see FIG. 1) and the bladder 40 is inflated with a fluid, typically air, through inflation valve 1.62, 2.62, 3.62. If an overinflation of the bladder 40 occurs, elastomeric seal 1.54, 2.54, 3.54 will become elastically deflected, as hereinbefore described, so as to allow excess fluid pressure within the bladder 40 to escape out into the exterior environment 52. When sufficient excess fluid pressure has been released from within bladder 40, the hoop stress of elastomeric seal 1.54, 2.54, 3.54 will cause the resealing of the pressure release outlet 1.50, 2.50, 3.50. While all plugs 30 are sealing their respective openings of the DWV system, the now-closed DWV system is then pressurized with a fluid such as water or air, for a period of time to determine if the DWV system is leak free, in which case it will hold a rated pressure for the test duration. After successful testing or when the maintenance function has been completed such that flow blockage is no longer required, the temporary plugs 30 are then deflated and removed.

INDUSTRIAL APPLICABILITY

The plug with pressure release valve of the present invention is used to temporarily seal access openings of a drain, waste, and vent ("DWV") pipe or plumbing or sewer system so that the DWV or sewer system may be pressure tested for leaks, or to block flow through a pipe while a maintenance function is being performed. The pressure release valve of the plug releases excess pressure within a bladder of the plug when overinflation of the bladder occurs during sealing of the plug within a pipe or access opening.

Although the present invention has been described and illustrated with respect to a preferred embodiment and a preferred use therefor, it is not to be so limited since modifications and changes can be made therein which are within the full intended scope of the invention.

We claim:

1. A plug for use in sealing a pipe having a generally cylindrical internal pipe wall, said plug comprising an inflatable bladder having an interior void defined within said bladder; said plug further comprising a pressure release valve being mounted into an end of said plug, said pressure release valve including:
   (a) a valve core having a pressure release passageway therethrough, said pressure release passageway having a pressure release inlet in fluid communication with said interior void and further having a pressure release outlet in selective fluid communication with an exterior environment outside said bladder, said pressure release inlet and said pressure release outlet being joined by a bore through said valve core;
   (b) an elastomeric seal having a first seal portion always under hoop stress about a portion of said valve core and selectively sealing said pressure release outlet from said exterior environment, wherein, when overinflation of said bladder occurs, said first seal portion becomes elastically deflected to unseal said pressure release outlet from said exterior environment and thereby allow excess fluid pressure within said bladder to be released through said pressure release passageway and out said pressure release outlet into said exterior environment, said hoop stress causing said first seal portion to reseal said pressure release outlet from said exterior environment after sufficient excess fluid pressure within said bladder has been released.

2. The plug as recited in claim 1, in which said pressure release valve further includes an inflation passageway therethrough in fluid communication with said interior void and an inflation valve interposed between said inflation passageway and said exterior environment.

3. The plug as recited in claim 2, in which said pressure release inlet opens into said inflation passageway such that said pressure release passageway is in fluid communication with said interior void through said inflation passageway.

4. The plug as recited in claim 3, in which said valve core is received into a valve body, entrappingly sealing a second portion of said elastomeric seal between said valve core and said valve body.

5. The plug as recited in claim 4, in which said inflation valve is a Schrader valve.

6. The plug as recited in claim 1, in which said pressure release valve includes a ferrule that crimpingly seals a second portion of said elastomeric seal to said valve core.

7. The plug as recited in claim 6, in which said pressure release inlet opens into said inflation passageway such that said pressure release passageway is in fluid communication with said interior void through said inflation passageway.

8. The plug as recited in claim 7, in which said inflation valve is a Schrader valve.

* * * * *